(12) United States Patent
Shah

(10) Patent No.: US 7,481,350 B1
(45) Date of Patent: *Jan. 27, 2009

(54) SOCKET-WELDED PIPE JOINT

(76) Inventor: Nitin J. Shah, 9618 Delta Dr., Richmond, VA (US) 23238

( * ) Notice: Subject to any disclaimer, the term of this patent is extended or adjusted under 35 U.S.C. 154(b) by 401 days.

This patent is subject to a terminal disclaimer.

(21) Appl. No.: 11/340,266

(22) Filed: Jan. 26, 2006

(51) Int. Cl.
*B23K 31/02* (2006.01)

(52) U.S. Cl. .................. 228/169; 29/525.14; 29/890.14

(58) Field of Classification Search ............... 285/288.1, 285/288.9, 288.3, 288.4, 289.1, 288.2, 288.5, 285/416; 29/525.14, 890.131, 890.043, 890.036, 29/890.14; 228/165, 168, 169
See application file for complete search history.

(56) References Cited

U.S. PATENT DOCUMENTS

| | | | | |
|---|---|---|---|---|
| 1,877,433 A * | 9/1932 | Brook | | 285/289.2 |
| 2,878,040 A * | 3/1959 | Hobbs | | 285/288.1 |
| 3,078,551 A * | 2/1963 | Patriarca et al. | | 29/890.043 |
| 3,473,215 A * | 10/1969 | Alan | | 228/165 |
| 3,680,200 A * | 8/1972 | Terrill et al. | | 285/289.1 |
| 3,750,248 A * | 8/1973 | Morris | | 29/890.07 |
| 4,182,950 A * | 1/1980 | Boros | | 285/288.1 |
| 4,535,214 A * | 8/1985 | Meyer et al. | | 219/60.2 |
| 5,137,202 A * | 8/1992 | Purdy, III | | 285/289.1 |
| 5,333,918 A * | 8/1994 | Crout et al. | | 29/509 |
| 7,011,343 B1 * | 3/2006 | Shah | | 285/288.9 |

* cited by examiner

*Primary Examiner*—David E Bochna

(57) ABSTRACT

A welded pipe joint having reduced internal stresses comprises a pipe, a socket fitting, and an annular weld. The end surface of the fitting is chamfered in a concave profile, so that the weld profile subtends an angle of from about 100 degrees to about 120 degrees, rather than the customary 90 degrees. The fitting and the pipe are welded together by applying, from outside the pipe, an annulus of added bead metal to the chamfered end surface of the fitting so as to surround the chamfered end surface, and fusing the base metal of the annular wall and pipe. The pipe has no dam or other protuberance to confine the bead of added metal. Prior to welding, the fitting may have an annular lip immediately surrounding the surface of the pipe and may also have a ring spaced from the lip. The ring may be integral with the fitting and spaced from the lip by thin, radially spaced metal bars or may be separate from the fitting.

9 Claims, 5 Drawing Sheets

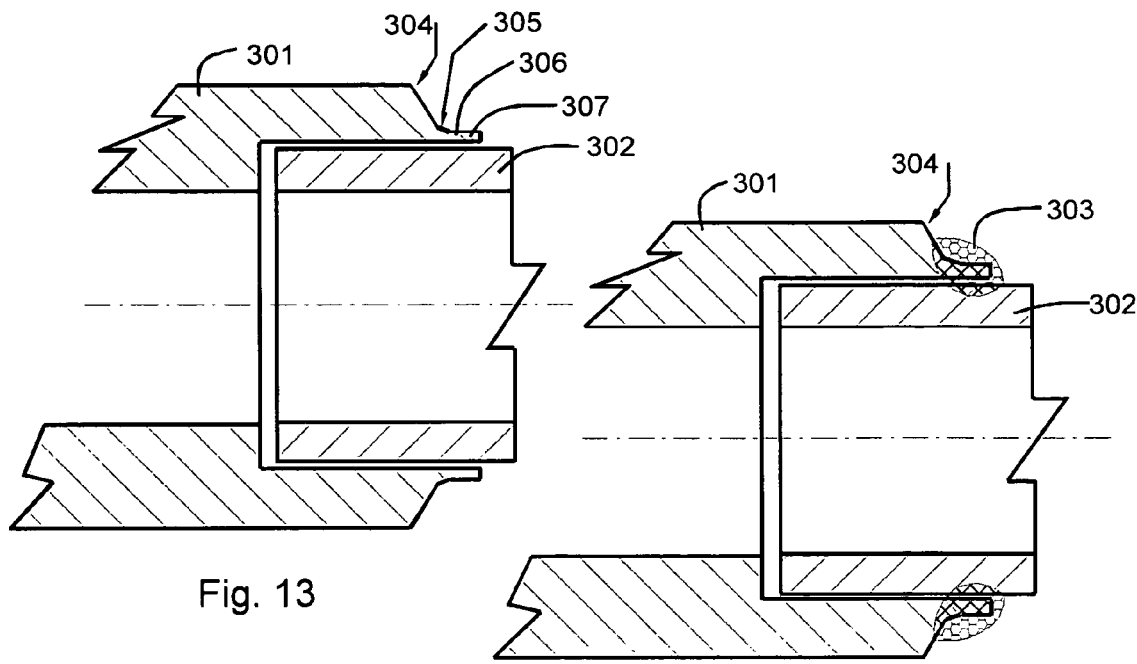
Fig. 13
Fig. 14
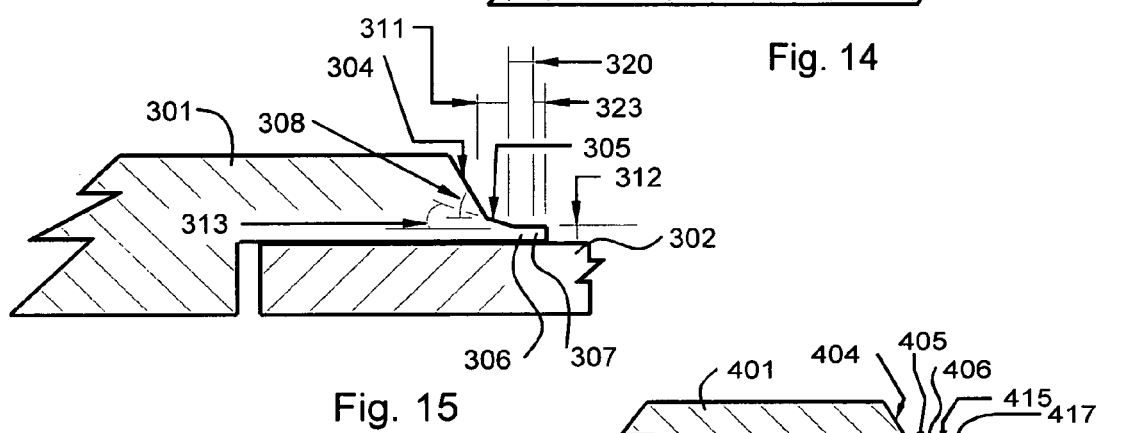
Fig. 15
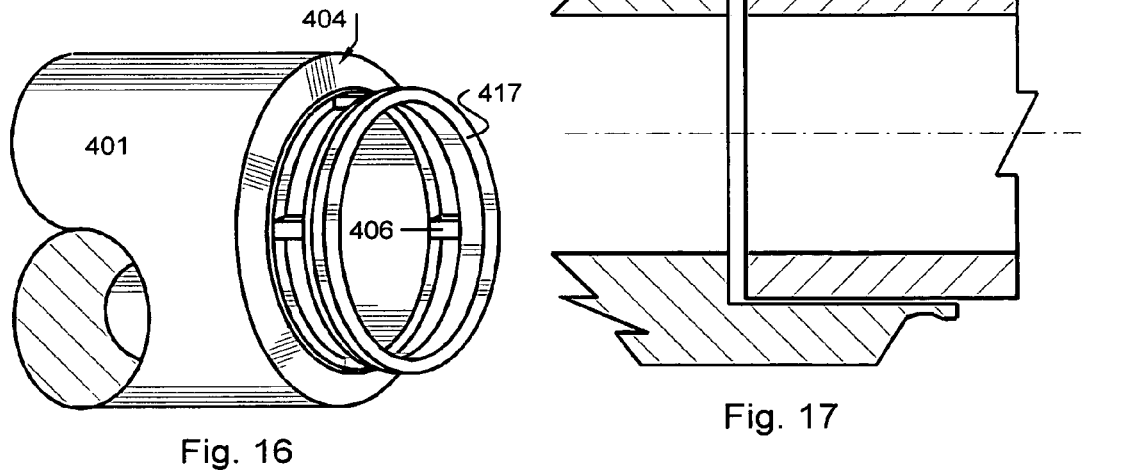
Fig. 16
Fig. 17

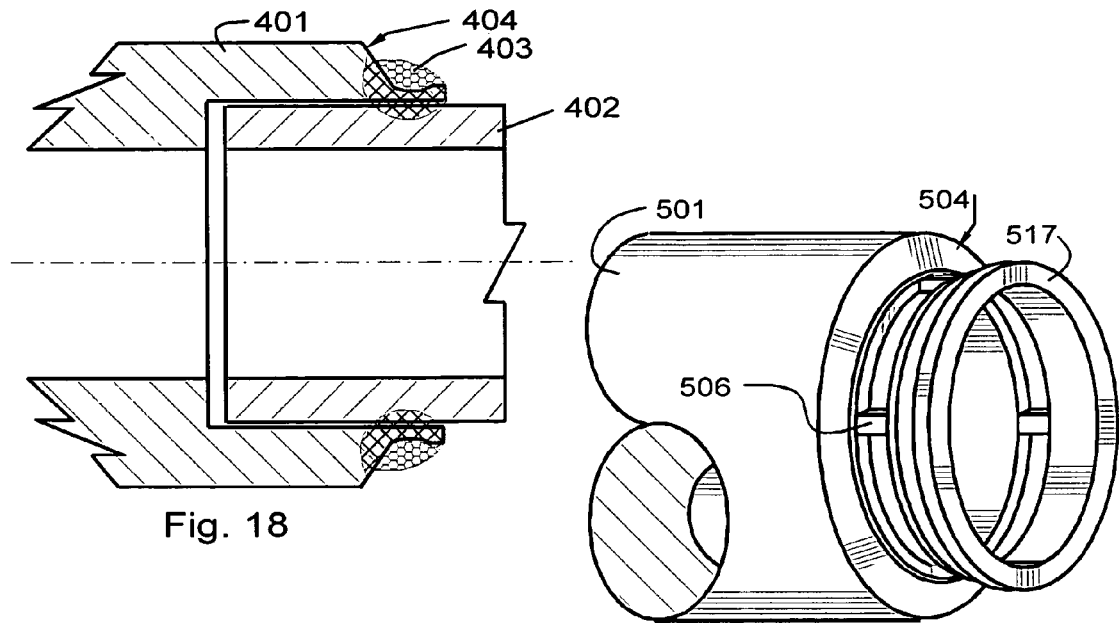
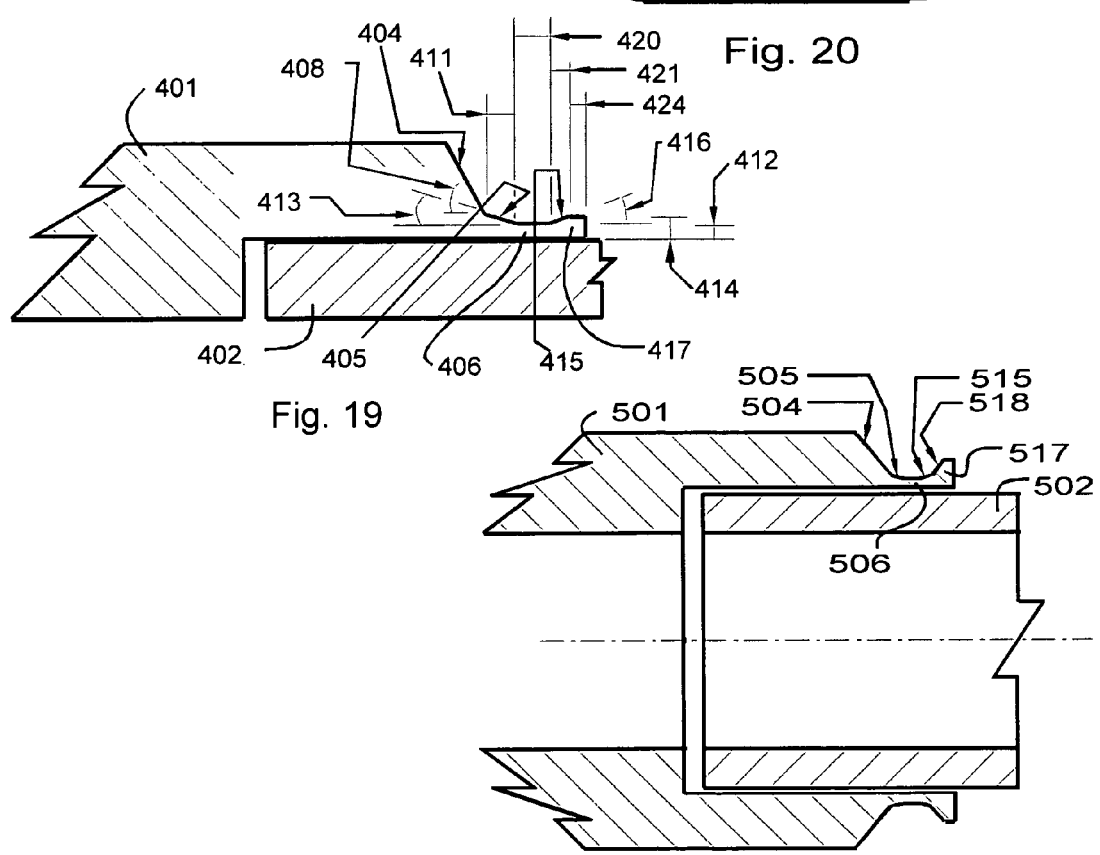
Fig. 18
Fig. 20
Fig. 19
Fig. 21

SOCKET-WELDED PIPE JOINT

RELATED APPLICATIONS

This application discloses and claims subject matter which was disclosed in provisional patent application Ser. No. 60/418,061 filed Oct. 11, 2002, provisional patent application Ser. No. 60/449,471 filed Feb. 24, 2003, and regular patent application Ser. No. 10/646,583, filed Aug. 22, 2003, now U.S. Pat. No. 7,011,343.

TECHNICAL FIELD

This invention pertains to the field of welding metal pipe segments and metal pipe fittings to each other and to equipment.

BACKGROUND

In plants such as power plants, process plants, and the like, it is necessary to transfer fluids, including liquids, gases, and fluidized solids, from one location to another, and between different equipment. This is accomplished by piping layouts. When a piping layout is created, it must provide for changing directions of the piping, connecting two or more pipe segments, and/or connecting pipe segments to equipment components or fittings.

Based on issued patents relating to welding and pipe connections, as well as on a survey of the industry, it can be said that there are presently two approaches for making such welded connections. One is known as a butt-welded connection, in which both the connecting elements are butted against each other and welded together. The other is known as a socket-welded connection, in which one of elements is a socket and the other is a pipe segment. An end of the pipe segment is inserted into the socket, and the two are welded together. Socket-welded connections are commonly used in small diameter piping. In nuclear power plants, for example, socket-welded connections are normally used only in piping with a nominal diameter of two inches and smaller. Normally, butt-welded joints are stronger than socket-welded joints. However, the construction tolerances for butt-welded joints are more stringent than those for socket-welded joints.

In many butt-welded joints, the end surfaces of the pipes being joined are beveled or chamfered. As disclosed in U.S. Pat. No. 1,842,298 and No. 1,903,315, some socket-welded joints may simulate a butt-welded joint, as far as the shape of the weld is concerned. Such simulations required a non-standard pipe having on its outer surface a dam for confining the added weld metal, which must be configured and positioned to specifically complement a particular fitting.

Failures of socket-welded connections have been identified in the past, resulting in a loss of production and revenues due to shutdown of plants. These pipe segments may contain high-pressure fluid. Bursting of such a pipe segment can result in personal injury, even death. Significant research has been performed to reduce these failures. The following are examples of such research papers:

J. K. Smith, "Vibrational Fatigue Failures in Short Cantilevered Piping with Socket-Welded Fittings," ASME PVP-Vol. 338-1, 1996.

P. C. Riccardella et al, "Fracture Mechanics Analysis of Socket-Welds under High Cycle Vibrational Loading," ASME PVP-Vol. 353, 1997.

M. Higuchi et al, "Fatigue Strength of Socket-Welded Pipe Joints," ASME PVP-Vol. 313-1, 1995.

M. Higuchi et al, "A Study on Fatigue Strength Reduction Factor for Small Diameter Socket-Welded Pipe Joints," ASME PVP-Vol. 338-1, 1996.

It is well known in the industry that the process of welding creates significant residual stresses in the components welded together. These stresses are so strong that they are capable of warping very thick steel plates. Research directed to failures of socket-welded fittings attributes the failures to such residual stresses created by the welding process. To reduce the residual stresses created by the welding process, the welding process needs to be very, very slow. The research has also led to recommendations that welding beads be applied in a very specific sequence. These recommendations are difficult to follow in practice, and they tend to be costly and time-consuming.

SUMMARY OF THE INVENTION

The object of this invention is to provide a socket-welded pipe joint which is practical, provides better fusion of metal, and reduces residual stresses. These will result in fewer failures of the joints. In the first two embodiments, the end of fitting is configured so that the fusion of the base metal of the end portion of the fitting will help to reduce the residual stresses at the root of the joint. These are the simpler of the embodiments presented herein. The remaining four embodiments will help to reduce the residual stresses at both the toe and the root of the joint by using the heat in better fusion of the base metal. Six embodiments of the invention achieve these objectives. This invention includes a welded joint and a method of making a welded joint, as well as a hollow metal fitting and an assembly ready to be welded, to which my application Ser. No. 10/646,583 is directed.

BRIEF DESCRIPTION OF THE DRAWINGS

FIG. 13 is a fragmentary section view showing in radial profile the assembled components of a socket-welded joint including the fitting shown in FIG. 12, before welding.

FIG. 14 is a fragmentary section view showing in radial profile a socket-welded joint including the fitting shown in FIG. 12, after welding.

FIG. 15 is a detailed view of a portion of the joint shown in FIG. 13.

FIG. 16 is a perspective view showing a socket-welded fitting of the fourth embodiment of the invention.

FIG. 17 is a fragmentary section view showing in radial profile the assembled components of a socket-welded joint including the fitting shown in FIG. 16, before welding.

FIG. 18 is a fragmentary section view showing in radial profile a socket-welded joint including the fitting shown in FIG. 16, after welding.

FIG. 19 is a detailed view of a portion of the joint shown in FIG. 17.

FIG. 20 is a perspective view showing a socket-welded fitting of the fifth embodiment of the invention.

FIG. 21 is a fragmentary section view showing in radial profile the assembled components of a socket-welded joint including the fitting shown in FIG. 20, before welding.

DESCRIPTION OF THE PREFERRED EMBODIMENTS

Figure 1:
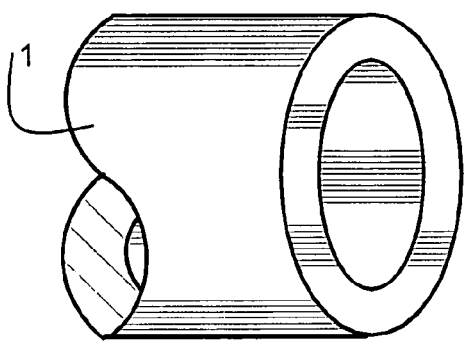
FIG. 1 is a perspective view of an end of a prior art socket-welded fitting.
Figure 2:
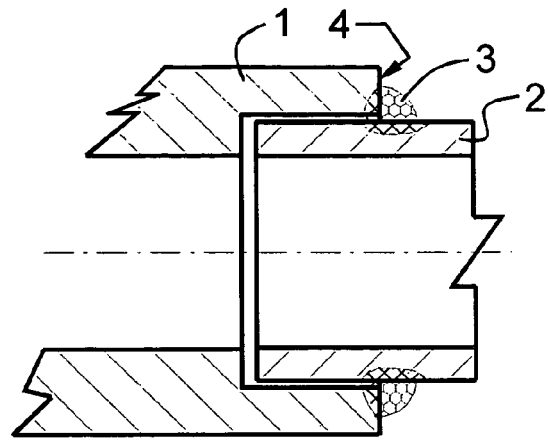
FIG. 2 is a fragmentary section view showing in radial profile a socket-welded joint including the fitting shown in FIG. 1.
Figure 3:
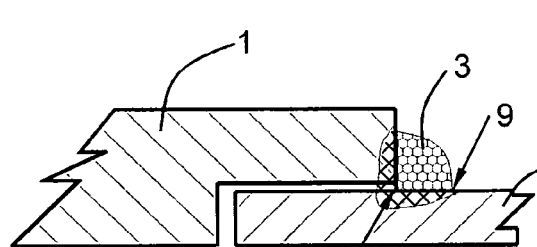
FIG. 3 is a detailed view of a portion of the joint shown in FIG. 2.

FIGS. 1-3 illustrate a typical socket-welded connection presently used in the industry. The socket-welded fitting shown in FIG. 1 is available in the market. If the pipe segment is to be connected to equipment, the equipment may be configured like an end of a socket-welded fitting. FIG. 2 shows an end of pipe segment 2 inserted in the end of a socket-welded fitting 1. They are joined together by a weld 3 between the end surface 4 of the fitting and the exterior surface of the wall of pipe segment 2. FIGS. 1-3, as well as the other figures of the drawings, are fragmentary, with the other, remote, left hand end along the longitudinal axis of fitting 1 not being shown. The view in FIG. 2 is after the welding is performed with some of the pipe and fitting base metal fused. (The use of "fuse" and cognate terms herein is in accordance with a dictionary definition of that term, namely "To liquefy by heat: to render fluid; to dissolve; to melt. To unite or blend, as if melted together.") It will be understood that the fused metal shown in this figure and other figures are for illustration purposes, as the precise locations of the boundaries between fused and unfused metal cannot be accurately predicted due to many variables that control the melting of the metal. The gap in the axial direction between pipe segment 2 and the edge inside the socket-welded fitting is a standard practice and it is believed that it reduces residual stresses. (As used herein, "axis" and cognate terms refer to the longitudinal axis, unless a different interpretation is required by the context.) The gap between socket-welded fitting 1 and piping segment 2 in the radial direction is a standard practice, makes the construction easier, and is due to the difference between the inner diameter of the socket-welded fitting 1 and the outer diameter of the pipe segment 2. As shown in FIGS. 1-3 and other figures of the drawings, these gaps are exaggerated for purposes of illustration. Failures of this type of joint may initiate at a "toe" or "root" of the weld. Location 9 in FIG. 3 is called a "toe" and location 10 a "root". The present invention is believed to be an improvement upon the prior art shown in FIGS. 1-3.

Figure 4:
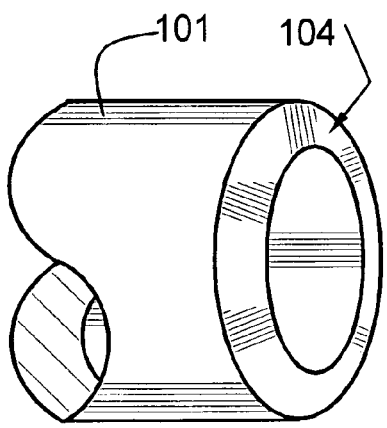
FIG. 4 is a perspective view showing a socket-welded fitting of the first embodiment of the invention.
Figure 5:
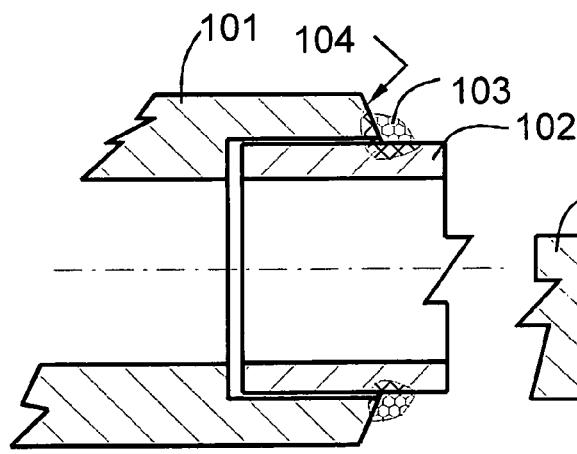
FIG. 5 is a fragmentary section view showing in radial profile a socket-welded joint including the fitting shown in FIG. 4.
Figure 6:
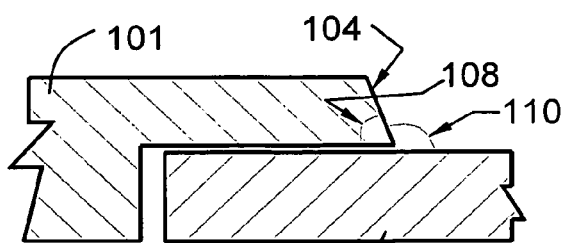
FIG. 6 is a detailed view of a portion of the joint shown in FIG. 5.
Figure 7:
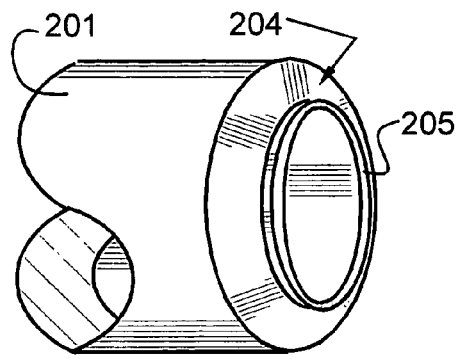
FIG. 7 is a perspective view showing a socket-welded fitting of the second embodiment of the invention.
Figure 25:
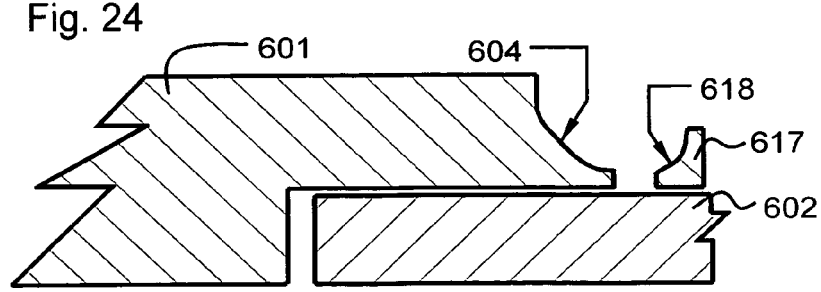
FIG. 25 is a detailed view of a portion of the joint for the sixth embodiment, similar to the one shown in FIG. 21, without bars.

The first embodiment of the invention is shown in FIGS. 4, 5 and 6. Similar to the prior art configuration, this embodiment has modified socket-welded fitting 101, the end of the pipe segment 102 inserted inside the socket, and a weld 103. The view in FIG. 5 is after the welding is performed with some of the pipe and fitting base metal fused. The difference between the prior art configuration shown in FIGS. 1-3, and this embodiment is that the edge 104 is chamfered as shown in FIG. 5, while prior art edge 4 shown in FIG. 2 is vertical and 90° to the wall of the pipe segment 2. (As used herein, the term "chamfer" refers to a radially outward-facing annular surface which has been cut away, or is shaped as though it had been cut away, from surfaces which included a 90 degree angle; as viewed in cross section, the surface of the chamfer may include one or more straight lines and/or curves. Except for possible broadening to embrace a surface formed by a process that did not include physically cutting, and possible narrowing to specify that the surface is radially outward-facing, the use of "chamfer" and cognate terms herein is in accordance with a dictionary definition of that term, namely "The surface formed by cutting away the arris, or angle, formed by two faces of a piece of timber, stone, etc." As used herein, "radially outward-facing" means that the entire chamfered surface would be visible to an imaginary observer viewing it from outside the fitting, from a direction generally perpendicular to the longitudinal axis of the fitting; that is, the innermost surface of the chamfer extends away from the shoulder and beyond the outermost surface of the chamfer, in the axial direction, and the chamfer would not appear to be "undercut" as viewed by such an observer. Additionally, the size and profile of the weld 103 in FIG. 5 may be different compared to the profile of the weld 3 in FIG. 2. The weld size and profile have to be determined in all the embodiments based on the diameter and the thickness of pipe segment and the necessary strength of the weld joint. The slanting edge, in which the entire chamfer is a straight line, is shown for the whole thickness of the fitting in FIGS. 5 and 6. However, the slanting edge can terminate at a smaller height. This is applicable to all the embodiments identified here. The example of this type of edge is illustrated in FIG. 25.

FIG. 6 shows the angle 108 between the edge 104 and the longitudinal axes of the fitting and the pipe. For the best joint, angle 108 should be between 60° and 80° so that the supplemental angle 110 is between 100° and 120°.

The advantage of the first embodiment is that some of the heat of the welding will be used in melting the base metal at the bottom apex of the edge 104, thereby reducing the residual stresses and providing better fusion. This is the simplest embodiment.

Figure 8:
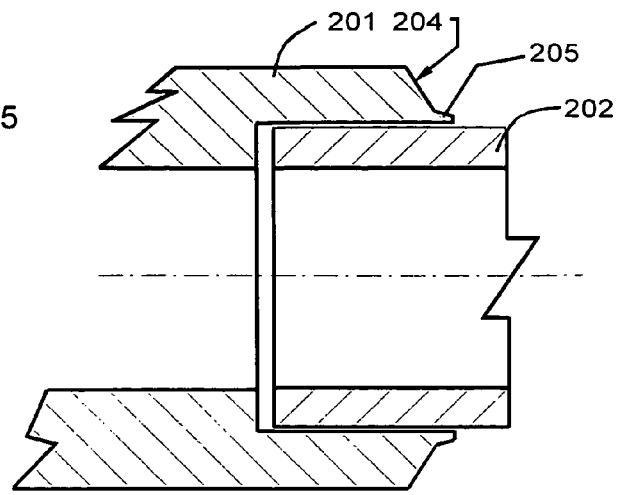
FIG. 8 is a fragmentary section view showing in radial profile the assembled components of a socket-welded joint including the fitting shown in FIG. 7, before welding.
Figure 9:
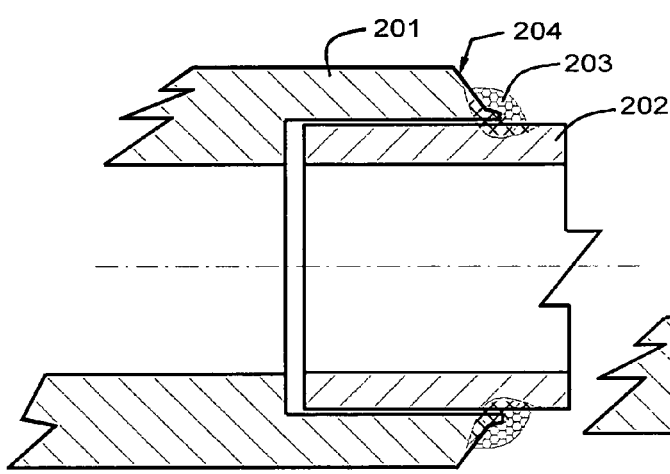
FIG. 9 is a fragmentary section view showing in radial profile a socket-welded joint including the fitting shown in FIG. 7, after welding.
Figure 10:
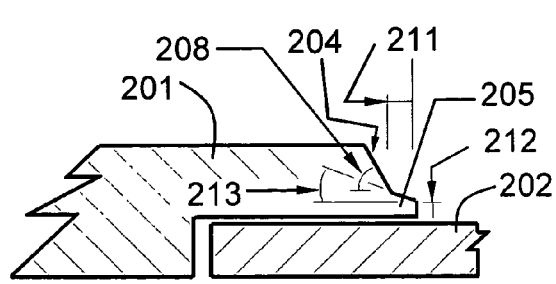
FIG. 10 is a detailed view of a portion of the joint shown in FIG. 8.

The second embodiment is shown in FIGS. 7, 8, 9 and 10. Similar to the first embodiment, the second embodiment has modified socket-welded fitting 201, the end of the pipe segment 202 inserted inside the socket, and a weld 203. In addition, chamfered edge 204 includes the surface of lip 205, which is similar to lips in butt-welded joints. The weld size and profile in this embodiment will also have to be determined based on the diameter and the thickness of the pipe segment and the necessary strength of the weld joint. The detail of the end of the modified socket-welded fitting is shown in FIG. 10. Lip length 211 and lip thickness 212 are to be determined based on the diameter and the thickness of the pipe end and the necessary strength of the weld joint. For the best joint, the lip angle 213 should be between 0° and 30°. The view in FIG. 8 is before the welding is performed. The view in FIG. 9 is after the welding is performed with some of the pipe and fitting base metal fused.

FIG. 10 shows the angle 208 between the edge 204 and the longitudinal axes of the fitting and the pipe. For the best joint, angle 208 should be between 60° and 80° so that the supplemental angle is between 100° and 120°.

The advantages of this embodiment are that more of the heat of the welding will be used in melting the base metal of the lip 205 and some of the base metal at the bottom apex of the edge 204 reduces the residual stresses and provides better fusion. However, this embodiment is slightly more complicated than the first embodiment.

Figure 11:
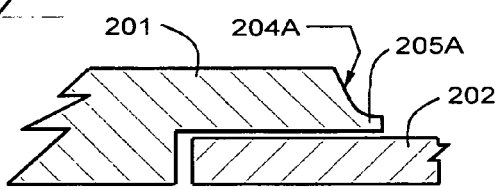
FIG. 11 is a detailed view of a portion of a joint, similar to the one shown in FIG. 8, with a curved edge.

FIG. 11 shows a variation of the second embodiment in which the surface of lip 205A merges gradually into the remainder of chamfered edge 204A. That is, the profile of the major portion of the chamfered edge is a curve rather than two intersecting straight lines.

Figure 12:
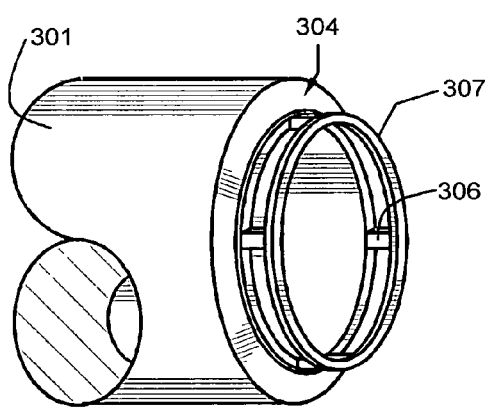
FIG. 12 is a perspective view showing a socket-welded fitting of the third embodiment of the invention.

The third embodiment is shown in the FIGS. 12, 13, 14 and 15. Similar to the second embodiment, this embodiment has modified socket-welded fitting 301, the end of the pipe segment 302 inserted inside the socket, and a weld 303. Chamfered edge 304 includes inwardly flared surface 305 and thin metal bars 306 extending parallel to the longitudinal axis. The size and number of the bars will be based on the diameter and the thickness of the pipe segment 302 and the necessary strength of the weld joint. Chamfered edge 304 also includes a ring 307, which provides better fusion and reduces residual stresses at the toe of the weld. The metal bars 306 are provided to connect the ring 307 to, and accurately spaces it from, the rest of the fitting. The size of the ring 307 will be based on the diameter and the thickness of the pipe segment 302 and the necessary strength of the weld joint. The detail of the end of the modified socket-welded fitting for the third embodiment is shown in FIG. 15. The dimensions 311, 312, 320 and 323 are to be determined based on the thickness of the pipe end and the necessary strength of the weld joint. The angle 313 should be between 0° and 30°. The angle 313 may be continued for metal bars 306 or a different angle may be used. The angle 313 may be continued for ring 307 or different angle may be used. The view in FIG. 13 is before the welding is performed. The view in FIG. 14 is after the welding is performed and shows some of the pipe and fitting base metal fused. The cross sections shown in the FIGS. 13 and 14, and the corresponding drawings for the fourth and fifth embodiments, are through the bars. However, as is best shown by FIG. 12, most of the welding will be between the bars 306.

FIG. 15 shows the angle 308 between the edge 304 and the longitudinal axes of the fitting and the pipe. For the best joint, angle 308 should be between 60° and 80° so that the supplemental angle is between 100° and 120°.

The advantage of this third embodiment is that more heat of the welding will be used in melting the base metal of the flared surface 305, metal bars 306, and the metal ring 307, as well as some of the base metal of the remaining, larger diameter portion of edge 304, thereby reducing the residual stresses and providing better fusion. This embodiment will also provide reduction in the failure initiated at the toe of the weld 303 in addition to reducing failure at the root. However, this embodiment is slightly more complicated than the first two embodiments.

The fourth embodiment is shown in FIGS. 16, 17, 18 and 19. Similar to the third embodiment, this embodiment has modified socket-welded fitting 401, the end of the pipe segment 402 inserted inside the socket, and a weld 403. Chamfered edge 404 includes inwardly flared surface 405 and thin metal bars 406 extending parallel to the longitudinal axis. The size and number of the bars will be based on the diameter and the thickness of the pipe segment 402 and the necessary strength of the weld joint. Chamfered edge 404 also includes outwardly flared surface 415 at the end of the metal bars 406, providing better fusion, and reducing residual stresses at the toe of the weld. A thicker ring 417 is provided at the terminus of chamfered edge 404. The detail of the end of the modified socket-welded fitting for the fourth embodiment is shown in FIG. 19. The dimensions 411, 412, 414, 420, 421 and 424 are to be determined based on the thickness of the pipe end and the necessary strength of the weld joint. The angle 413 should be between 0° and 30°. The angle 413 may be continued for metal bar 406 or a different angle may be used. The angle of the flared surface 415 is identified as 416, and thickness of ring 417 is identified as 414. The angle 416 should be between 0° and 30°. As mentioned previously, the weld size and profile will have to be determined based on the diameter and the thickness of the pipe segment and the necessary strength of the weld joint. The weld directly deposited on the pipe induces residual stresses. Additional welding metal deposit on the weld or fitting in the vicinity of the pipe will reduce the induced residual stresses. Hence, the welding should not go beyond the edge of the socket-welded fitting in order to minimize the residual stresses in the pipe adjacent to the weld. This can also be done in the third, fifth, and sixth embodiments. The view in FIG. 17 is before the welding is performed. The view in FIG. 18 is after the welding is performed and shows some of the pipe and fitting base metal fused.

FIG. 19 shows the angle 408 between the edge 404 and the longitudinal axes of the fitting and the pipe. For the best joint, angle 408 should be between 60° and 80° so that the supplemental angle is between 100° and 120°.

The advantage of this fourth embodiment is that more heat of the welding will be used in melting the base metal having the inwardly flared surface 405, metal bars 406 and metal ring 417, as well as some of the base metal of the remaining, larger diameter portion of edge 404, thereby reducing the residual stresses and providing better fusion. Fusion of the base metal at the flared surface 415 and the additional thickness of the ring 417 will reduce the residual stresses in the pipe adjacent to the weld, reducing the possibility of a failure initiated at the toe of weld 403. Ring 417 also serves as a dam for minimizing the chances of the weld material going beyond it. However, this embodiment is more complicated compared to the first three embodiments.

Figure 22:
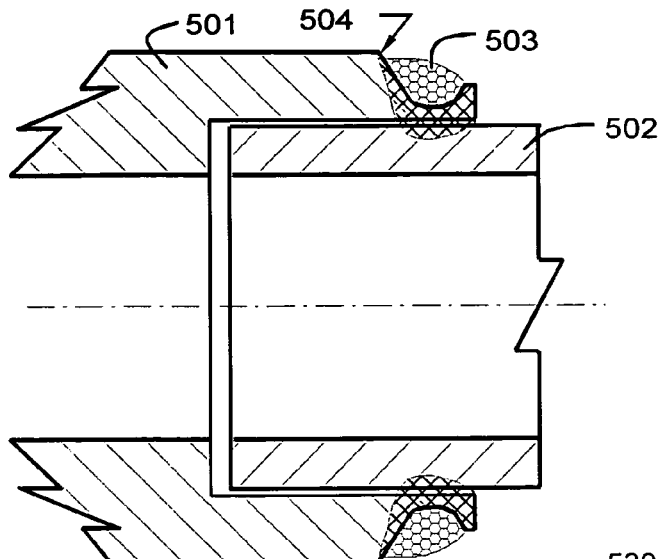
FIG. 22 is a fragmentary section view showing in radial profile the assembled components of a socket-welded joint including the fitting shown in FIG. 20, after welding.
Figure 23:
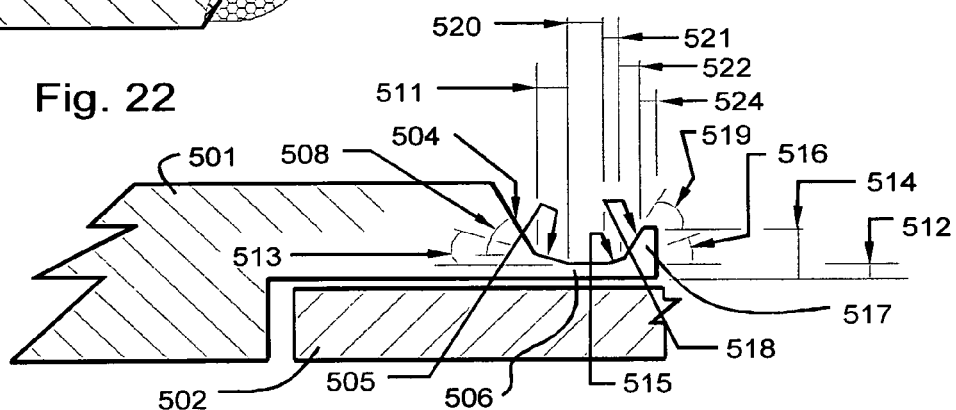
FIG. 23 is a detailed view of a portion of the joint shown in FIG. 21.
Figure 24:
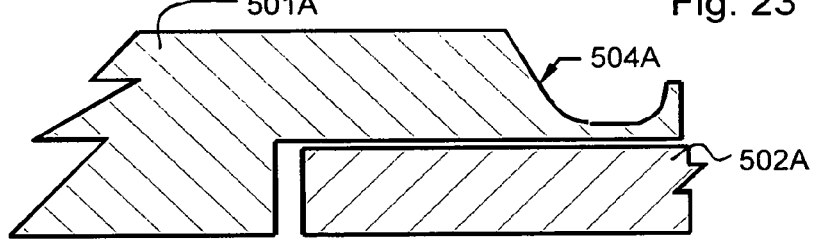
FIG. 24 is a detailed view of a portion of the joint, similar to the one shown in FIG. 21, with curved edges.

The fifth embodiment is shown in FIGS. 20, 21, 22 and 23. Similar to the fourth embodiment, this embodiment has modified socket-welded fitting 501, the end of the pipe segment 502 inserted inside the socket, and a weld 503. Chamfered edge 504 includes inwardly flared surface 505 and thin metal bars 506 extending parallel to the longitudinal axis. The size and number of the bars will be based on the diameter and the thickness of the pipe segment 502 and the necessary strength of the weld joint. Chamfered edge 504 also includes outwardly flared surface 515 at the end of the metal bars 506 for stability, providing better fusion, and reducing residual stresses at the toe of weld 503. The detail of the end of the modified socket-welded fitting for the fifth embodiment is shown in FIG. 23. The dimensions 511, 512, 514, 520, 521, 522 and 524 are to be determined based on the thickness of the pipe end and the necessary strength of the weld joint. The dimensions 511 and 512 are to be determined based on the thickness of the pipe end. The angle 513 should be between 0° and 30°. The angle 513 may be continued for metal bar 506 or different angle may be used. In addition to outwardly flared surface of 515, which corresponds to outwardly flared surface of 415 in the fourth embodiment, another outwardly flared surface 518 and thicker ring 517 are included in this embodiment. The angle of the flared surface 515 is identified as 516, and the length of flared surface 515 as 521. The angle 516 should be between 0° and 30°. The angle 519 for the flared surface 518 should be between 60° and 80°. The length of flared surface 518 is identified as 522. The thickness of the ring 517 is identified as 514. This edge shape creates an annular well for deposit of the weld material, will increase the strength of the joint and minimize chances of weld material going beyond it. In this sense, ring 517 serves as a dam. This edge shape will also minimize the residual stresses in the pipe adjacent to the weld. The view in FIG. 21 is before the welding is performed. The view in FIG. 22 is after the welding is performed and shows some of the pipe and fitting base metal fused.

FIG. 23 shows the angle 508 between the edge 504 and the longitudinal axes of the fitting and the pipe. For the best joint, angle 508 should be between 60° and 80° so that the supplemental angle is between 100° and 120°.

The advantage of this fifth embodiment is that more heat of the welding will be used in melting the base metal of the lip 505, metal bars 506, and metal ring 517, as well as some of the base metal of the remaining, larger diameter portion of edge 504, thereby reducing the residual stresses and providing better fusion. Fusion of the base metal at the outwardly flared surfaces 515 and 518 and the additional thickness of the ring 517 will reduce the residual stresses in the pipe adjacent to the weld, thereby reducing the possibility of a failure initiated at the toe 9 (as identified in FIG. 3) in addition to reducing possibility of a failure initiated at the root 10 (as identified in FIG. 3). However, this embodiment is the most complicated of the embodiments proposed here.

The advantages of the bars in the third, fourth and fifth embodiments are that the bar allows a fixed distance between the main fitting and the ring and connect them together for ease of handling and manufacturing efficiency.

The sixth embodiment is shown in FIG. 25. If flexibility in width of the weld is needed, the bars used in the third, fourth and fifth embodiments can be eliminated. The fitting will be made into two pieces. The end of pipe segment 602 is inserted into ring 617 and then into fitting 601. Chamfered edge 604 of the fitting and outwardly flared surface 618 of the ring correspond to chamfered edge 504 and outwardly flared surface 518 in the fifth embodiment, respectively. The distance between the two pieces can be increased or decreased according to the size of the weld required. The residual stresses will be reduced at both the toe and the root locations due to melting of the end portions of the fitting 601 and the ring 617. The chamfered edges 604 and 608 are similar to the chamfered edges described previously.

Figure 26:
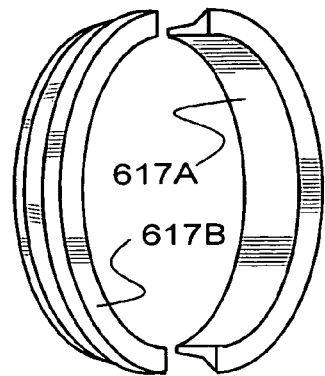
FIG. 26 is a perspective view showing a two-piece ring.

The ring 617 may be made in more that one piece, put in place and welded together for ease of assembly, if necessary or desired. A ring made in two parts 617A and 617B is shown in FIG. 26. The two-piece ring alleviates the need for inserting an end of the pipe through a one-piece ring.

In all of the embodiments described, the pipe, at least at its end portion being welded to the fitting, has a cylindrical outer surface with a profile which is uniform as viewed in a cross-section taken along the longitudinal axis (i.e., a radial profile). That is, the portion does not have any dam, pocket, projection, recess, or similar functional feature that could require the pipe to be configured, dimensioned, selected, or positioned to work with or otherwise correspond to a particular fitting. Typical applications of the invention will utilize standard pipe in which the entire length of the outer surface will be free of any such feature. In all of the embodiments except the first embodiment, the radial profile of the chamfer is concave, which is preferred. In these preferred profiles, the chamfer is also radially outward-facing, as previously described. Thus, on the radial profile of the annular wall of the fitting, the intersection of the chamfered end surface with the outer cylindrical surface is closer to the remote end of the fitting than any other point on the chamfered end surface is to that remote end. Also, on the radial profile of the annular wall of the fitting, that intersection is radially farther from the annular wall's cylindrical inner surface than any other point on the chamfered end surface is from the annular wall's cylindrical inner surface. In addition, with the exception of the embodiments shown in FIGS. 12-24, on the radial profile of the annular wall of the fitting the radial distance between any given point on the chamfered end surface never exceeds the corresponding distance between any other point on the chamfered surface which is closer to the remote end than the given point. There is no concavity or chamfer on the inner surface of the fitting's annular wall.

In addition, in all of the embodiments described the supplemental angle corresponding to angle 110 in FIG. 6 (i.e., the angle facing away from the remote end of the fitting) is desirably in the same range of 100° to 120°, as measured between the major portion of the end surface and the longitudinal axis of the fitting.

Instead of a circular cross section, the fitting, pipe and weld may have an elliptical or other non-circular cross section.

It will be understood that, while presently preferred embodiments of the invention have been illustrated and described, the invention is not limited thereto, but may be otherwise variously embodied within the scope of the following claims. It will also be understood that the method claims are not intended to be limited to the particular sequence in which the method steps are listed therein, unless specifically stated therein or required by description set forth in the steps.

I claim:

1. A method of making a socket-welded metal joint with reduced residual stresses resulting from the welding, which method comprises
   I. providing an assembly comprising
   A. a hollow metal fitting which includes
      (1) an internal annular shoulder having an inner diameter and an outer diameter; and
      (2) an annular wall which
         (a) extends from the shoulder,
         (b) has a cylindrical inner surface,
         (c) has a cylindrical outer surface whose diameter is greater than the inner diameter of the shoulder,
         (d) defines with the shoulder a cylindrical socket having a common longitudinal axis with the annular wall, and
         (e) has an end surface connecting the cylindrical outer and inner surfaces, which end surface is chamfered so as to create a radially outward-facing chamfer whose profile is such that, as viewed in a cross section taken along the longitudinal axis, is concave,
   B. a metal pipe which includes at one end (1) a cylindrical outer surface which has a uniform radial profile and is free of any dam, pocket, projection, recess, or similar feature that could require the pipe to be configured, dimensioned, selected, or positioned to work with or otherwise correspond to a particular fitting, and (2) a cylindrical inner surface, with the endmost portion of the pipe at said end being disposed in the socket so that the outer surface of the pipe is within the inner surface of the annular wall of the socket; and II. welding the fitting and the pipe together by applying an annulus of added bead metal to the chamfered end surface of the fitting so as to surround the chamfered end surface, and fusing the base metal of the annular wall and pipe.

2. A method according to claim 1 wherein the outer surface of the pipe is cylindrical over its entire length.

3. A method according to claim 1 wherein the chamfered end surface terminates in an annular lip at the cylindrical inner surface of the annular wall.

4. A method according to claim 1 wherein the fitting's chamfered end surface terminates, at the cylindrical inner surface of the annular wall in an annular lip connected to an annular ring by thin, radially spaced metal bars which are parallel to the longitudinal axis.

5. A method according to claim 1 wherein the assembly further comprises a metal ring which is separate from the fitting, surrounds the pipe, is spaced from the fitting, and has an outwardly flared surface forming a flange at the end of the ring distant from the fitting.

6. A method according to claim 5 wherein the ring comprises two parts which are capable of forming the ring without having to pass the pipe through the ring.

7. A method according to claim 1 wherein, on a radial profile of the annular wall of the fitting, the intersection of the chamfered end surface with the outer cylindrical surface is radially farther from the inner cylindrical surface than any other point on the chamfered end surface is from the inner cylindrical surface.

8. A method according to claim 1 wherein, on a radial profile of the annular wall of the fitting, the radial distance between the inner cylindrical surface and any given point on the chamfered end surface never exceeds the corresponding radial distance between the inner cylindrical surface and any other point on the chamfered end surface, which other point is closer in the axial direction to the remote end of the fitting.

9. A socket welded metal joint with reduced residual stresses resulting from the welding, and thus a reduced propensity for failures initiating at the toe or root of the weld, which joint was made by a method according to claim 1.

* * * * *